US006236583B1

(12) United States Patent
Kikuchi et al.

(10) Patent No.: US 6,236,583 B1
(45) Date of Patent: May 22, 2001

(54) INVERTER AND MOTOR

(75) Inventors: Toshio Kikuchi, Yokosuka; Shinichiro Kitada, Tokyo; Yutaro Kaneko, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/570,283

(22) Filed: May 12, 2000

(30) Foreign Application Priority Data

May 14, 1999 (JP) ..................................... 11-134730
May 14, 1999 (JP) ..................................... 11-134742

(51) Int. Cl.[7] .......................... H02M 7/5387; H02P 5/34
(52) U.S. Cl. ............................ 363/132; 363/98; 318/801
(58) Field of Search ............................... 363/97, 98, 131, 363/132; 318/800, 801, 803, 807, 812

(56) References Cited

U.S. PATENT DOCUMENTS 5,008,801 * 4/1991 Glennon .............................. 363/132
5,414,339 * 5/1995 Masaki et al. ...................... 318/800
5,717,584 * 2/1998 Rajashekara et al. ................ 363/98

* cited by examiner

*Primary Examiner*—Matthew Nguyen
(74) *Attorney, Agent, or Firm*—Foley & Lardner

(57) ABSTRACT

A motor (4) comprises a stator which generates a rotating magnetic field according to the energization of plural groups (A, B) of coils, and a rotor rotated by the rotating magnetic field of the stator. An inverter (3) comprises the same number of switching circuits (3A, 3B) as the number of groups which supply alternating current to the coils of the groups (A, B) according to the switching action of switching elements (SW1–SW6, SW7–SW12) of each of the switching circuits (3A, 3B), and a control unit (10) which controls the switching elements (SW1–SW6, SW7–SW12) so that the sum of the terminal voltages of the coils of each of the groups (A, B) is constant.

9 Claims, 25 Drawing Sheets

COIL A

| DIRECTION OF POWER CURRENT | U→V, U→W | U→W, V→W | U→V, W→V | V→U, W→U | W→U, W→V | V→U, V→W |
|---|---|---|---|---|---|---|
| ROTATION ANGLE OF ROTOR | 0-60° | 60-120° | 120-180° | 180-240° | 240-300° | 300-360° |
| SW1 | H | H | H | L | L | L |
| SW2 | L | L | L | H | H | H |
| SW3 | L | L | H | H | H | L |
| SW4 | H | H | L | L | L | H |
| SW5 | L | H | L | H | L | H |
| SW6 | H | L | H | L | H | L |
| VOLTAGE (A) AT NEUTRAL POINT | 1/3Ed | 2/3Ed | 2/3Ed | 2/3Ed | 1/3Ed | 1/3Ed |

FIG.2A

COIL B

| DIRECTION OF POWER CURRENT | V→U, W→U | W→U, W→V | V→U, V→W | U→V, U→W | U→W, V→W | U→V, W→V |
|---|---|---|---|---|---|---|
| ROTATION ANGLE OF ROTOR | 0-60° | 60-120° | 120-180° | 180-240° | 240-300° | 300-360° |
| SW7 | L | L | L | H | H | H |
| SW8 | H | H | H | L | L | L |
| SW9 | H | H | L | L | L | H |
| SW10 | L | L | H | H | H | L |
| SW11 | H | L | H | L | H | L |
| SW12 | L | H | L | H | L | H |
| VOLTAGE (B) AT NEUTRAL POINT | 2/3Ed | 1/3Ed | 1/3Ed | 1/3Ed | 2/3Ed | 2/3Ed |

FIG.2B

| SUM OF (A) AND (B) | 3/3Ed | 3/3Ed | 3/3Ed | 3/3Ed | 3/3Ed | 3/3Ed |
|---|---|---|---|---|---|---|

FIG.2C

COIL B

| DIRECTION OF POWER CURRENT | U → V<br>↘ W | U → W<br>V ↗ | U → V<br>W ↗ | V → U<br>W ↗ | W → U<br>↘ V | V → U<br>↘ W |
|---|---|---|---|---|---|---|
| ROTATION ANGLE OF ROTOR | 0-60° | 60-120° | 120-180° | 180-240° | 240-300° | 300-360° |
| SW7 | L | L | L | H | H | H |
| SW8 | H | H | H | L | L | L |
| SW9 | H | H | L | L | L | H |
| SW10 | L | L | H | H | H | L |
| SW11 | H | L | L | L | H | L |
| SW12 | L | L | H | H | H | H |
| SUM OF VOLTAGES AT NEUTRAL POINTS | 2/3Ed | 1/3Ed | 1/3Ed | 1/3Ed | 2/3Ed | 2/3Ed |

FIG.2D

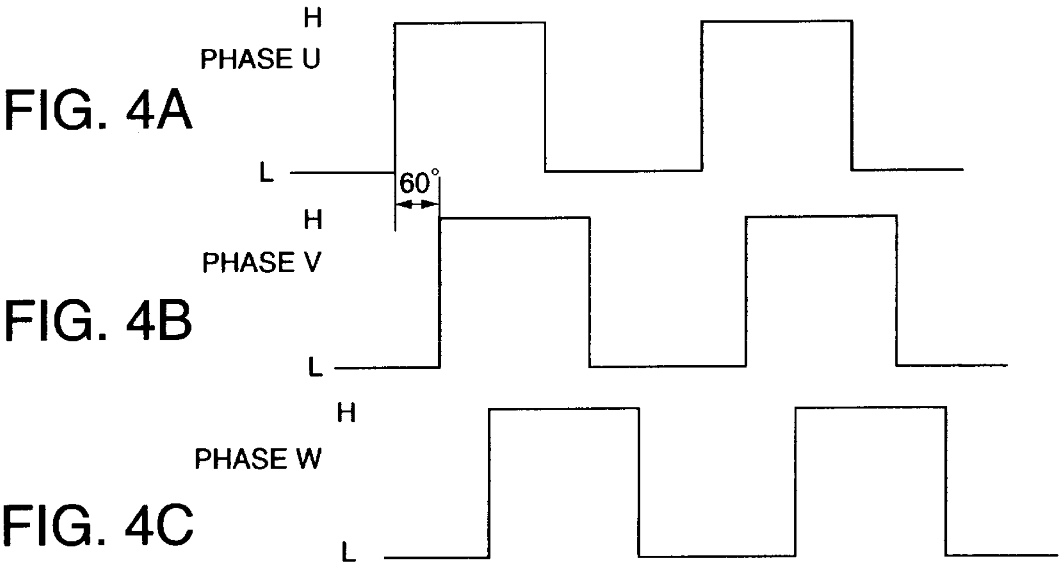
FIG. 4A
FIG. 4B
FIG. 4C
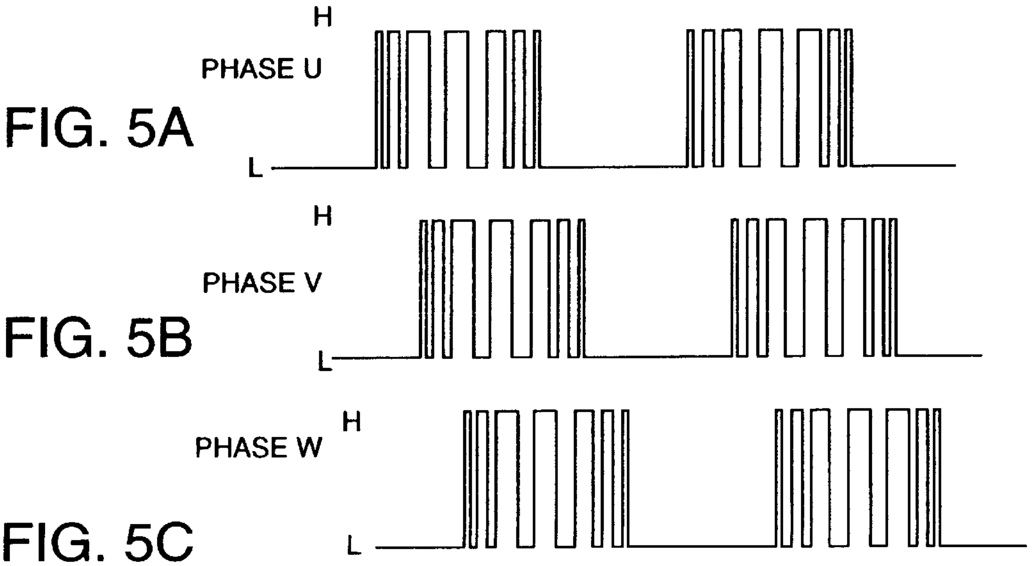
FIG. 5A
FIG. 5B
FIG. 5C

COIL A

| DIRECTION OF POWER CURRENT | U → V, ↘ W | U → W, V ↗ | U → V, W ↗ | V → U, W ↗ | W → U, ↘ V | V → U, ↘ W |
|---|---|---|---|---|---|---|
| ROTATION ANGLE OF ROTOR | 0-60° | 60-120° | 120-180° | 180-240° | 240-300° | 300-360° |
| SW1 | H H H L | H H L L | H L L L | L L L H | L L H H | L H H H |
| SW2 | L L L H | L L H H | L H H H | H H H L | H H L L | H L L L |
| SW3 | L L H H | L H H H | H H H L | H H L L | H L L L | L L L H |
| SW4 | H H L L | H L L L | L L L H | L L H H | L H H H | H H H L |
| SW5 | L H L H | H L H L | L H L H | H L H L | L H L H | H L H L |
| SW6 | H L H L | L H L H | H L H L | L H L H | H L H L | L H L H |
| | REPEAT THIS PATT-ERN | REPEAT THIS PATT-ERN | REPEAT THIS PATT-ERN | REPEAT THIS PATT-ERN | REPEAT THIS PATT-ERN | REPEAT THIS PATT-ERN |
| VOLTAGE (A) AT NEUTRAL POINT | 1/3Ed | 2/3Ed | 2/3Ed | 2/3Ed | 1/3Ed | 1/3Ed |

FIG.6A

COIL B

| DIRECTION OF POWER CURRENT | U → V, ↘ W | U → W, V ↗ | U → V, W ↗ | V → U, W ↗ | W → U, ↘ V | V → U, ↘ W |
|---|---|---|---|---|---|---|
| ROTATION ANGLE OF ROTOR | 0-60° | 60-120° | 120-180° | 180-240° | 240-300° | 300-360° |
| SW7 | L L L H | L L H H | L H H H | H H H L | H H L L | H L L L |
| SW8 | H H H L | H H L L | H L L L | L L L H | L L H H | L H H H |
| SW9 | H H L L | H L L L | L L L H | L L H H | L H H H | H H H L |
| SW10 | L L H H | L H H H | H H H L | H H L L | H L L L | L L L H |
| SW11 | H L H L | L H L H | H L H L | L H L H | H L H L | L H L H |
| SW12 | L H L H | H L H L | L H L H | H L H L | L H L H | H L H L |
| | REPEAT THIS PATT-ERN | REPEAT THIS PATT-ERN | REPEAT THIS PATT-ERN | REPEAT THIS PATT-ERN | REPEAT THIS PATT-ERN | REPEAT THIS PATT-ERN |
| VOLTAGE (B) AT NEUTRAL POINT | 2/3Ed | 1/3Ed | 1/3Ed | 3/3Ed | 2/3Ed | 2/3Ed |

FIG.6B

| | | | | | | |
|---|---|---|---|---|---|---|
| SUM OF (A) AND (B) | 3/3Ed | 3/3Ed | 3/3Ed | 3/3Ed | 3/3Ed | 3/3Ed |

FIG.6C

| DIRECTION OF POWER CURRENT | I → II<br>↘ III | I → III<br>II ↗ | I → II<br>III ↗ | II → I<br>III ↗ | III → I<br>↘ II | II → I<br>↘ III |
|---|---|---|---|---|---|---|
| ROTATION ANGLE OF ROTOR | 0-60° | 60-120° | 120-180° | 180-240° | 240-300° | 300-360° |
| SW1 | H | H | H | L | L | L |
| SW2 | L | L | L | H | H | H |
| SW3 | L | L | L | H | H | H |
| SW4 | H | H | H | L | L | L |
| SW5 | H | L | H | L | H | L |
| SW6 | L | H | L | H | L | H |
| SW7 | L | H | L | H | L | H |
| SW8 | H | L | H | L | H | L |
| SW9 | H | H | L | L | L | H |
| SW10 | L | L | H | H | H | L |
| SW11 | L | L | H | H | H | L |
| SW12 | H | H | L | L | L | H |
| SUM OF VOLTAGES AT NEUTRAL POINTS | 1/2Ed | 1/2Ed | 1/2Ed | 1/2Ed | 1/2Ed | 1/2Ed |

FIG.10

INVERTER AND MOTOR

FIELD OF THE INVENTION

This invention relates to a combination of an alternating current motor and an inverter which supplies a drive current to the alternating current motor.

BACKGROUND OF THE INVENTION

An inverter is known which, in order to obtain an alternating current which drives an alternating current motor, changes a direct current into an alternating current of a predetermined frequency and voltage.

The direct current is obtained from a battery or by rectifying an alternating current using a converter or a rectifier circuit.

SUMMARY OF THE INVENTION

In an alternating current motor operated by the output of such an inverter, the voltage of the neutral point of a coil is changed according to switching timings of switching elements of the inverter. This change generates a high frequency leakage current, so if such an alternating current motor is used for driving a vehicle, noise is generated which affects instruments mounted on the vehicle, e.g., the radio.

If a noise filter comprising a common mode reactor is inserted in the input circuit and output circuit of the inverter, the high frequency leakage current of the motor may decrease, but a sufficient effect is not necessarily achieved. Moreover, due to the volume and weight of the reactor, the volume and weight of the inverter necessarily increase which makes it unsuitable for installation in a vehicle with limited space. Further, since the reactor is expensive, the cost of the inverter also rises.

It is therefore an object of this invention to control the occurrence of the high frequency leakage current in an alternating current motor due to inverter current without using a noise filter.

It is another object of this invention to improve the motor efficiency of an alternating current motor which is operated by the output current from an inverter.

It is yet another object of this invention to provide a combination of a lightweight, compact inverter without high frequency leakage current, and an alternating current motor.

It is yet another object of this invention to suppress the torque ripple of an alternating current motor.

In order to achieve the above objects, this invention provides a motor and an inverter which drives the motor, wherein the motor and the inverter have following constructions.

The motor comprises a stator and a rotor. The stator comprises plural groups of windings, each of which has coils and generates a rotating magnetic field according to the energization of the coils of each group. The rotor rotates due to the rotating magnetic fields of the plural groups of windings.

The inverter comprises an identical number of switching circuits to the number of groups. Each of the circuits comprises plural switching elements and supplying alternating current to the coils of each group according to the switching action of the plural switching elements. The inverter further comprises a control unit which controls the switching elements of the switching circuits corresponding to each group so that the sum of terminal voltages of the coils of each group is constant.

This invention also provides a three-phase alternating current motor and an inverter which drives the motor, wherein the motor and the inverter have following constructions.

The motor comprises a stator and a motor. The stator generates a rotating magnetic field according to the supply of a three-phase alternating current to a first winding, second winding and third winding corresponding to each phase of the three-phase alternating current. The rotor rotates according to the rotating magnetic field of the stator.

The inverter comprises a first switching circuit which supplies alternating current to the first winding according to a switching action of plural switching elements, a second switching circuit which supplies alternating current to the second winding according to a switching action of plural switching elements, and a third switching circuit which supplies alternating current to the third winding according to a switching action of plural switching elements. The inverter further comprises a control unit which controls the switching elements of the first switching circuit, the switching elements of the second switching circuit, and the switching elements of the third switching circuit so that the sum of a terminal voltage of the first winding, a terminal voltage of the second winding and a terminal voltage of the third winding is constant.

The details as well as other features and advantages of this invention are set forth in the remainder of the specification and are shown in the accompanying drawings.

BRIEF DESCRIPTION OF THE DRAWINGS

FIGS. 2A–2D are tables showing the switching status of switching elements of the inverter driven by a square wave, the current of each coil of a motor, and the neutral point voltage of each coil.

FIGS. 4A–4C are timing charts which show output waveforms from the switching elements of phase U, phase V and phase W when the switching element of the inverter is driven by a square wave.

FIGS. 5A–5C are timing charts which show the waveforms of the currents of phase U, phase V and phase W supplied to the motor from the inverter when the switching elements are driven by pulse width modulation (PWM).

FIGS. 6A–6C are tables showing the switching status of the switching elements, the current which flows to each coil of the motor and the neutral point voltage when the switching elements are driven by pulse width modulation (PWM).

FIG. 10 is a table showing the switching status of the switching elements of the inverter, the current of each coil of a motor, and the neutral point voltage of each coil according to the second embodiment of this invention.

DESCRIPTION OF THE PREFERRED EMBODIMENTS

Figures 1A, 1B:
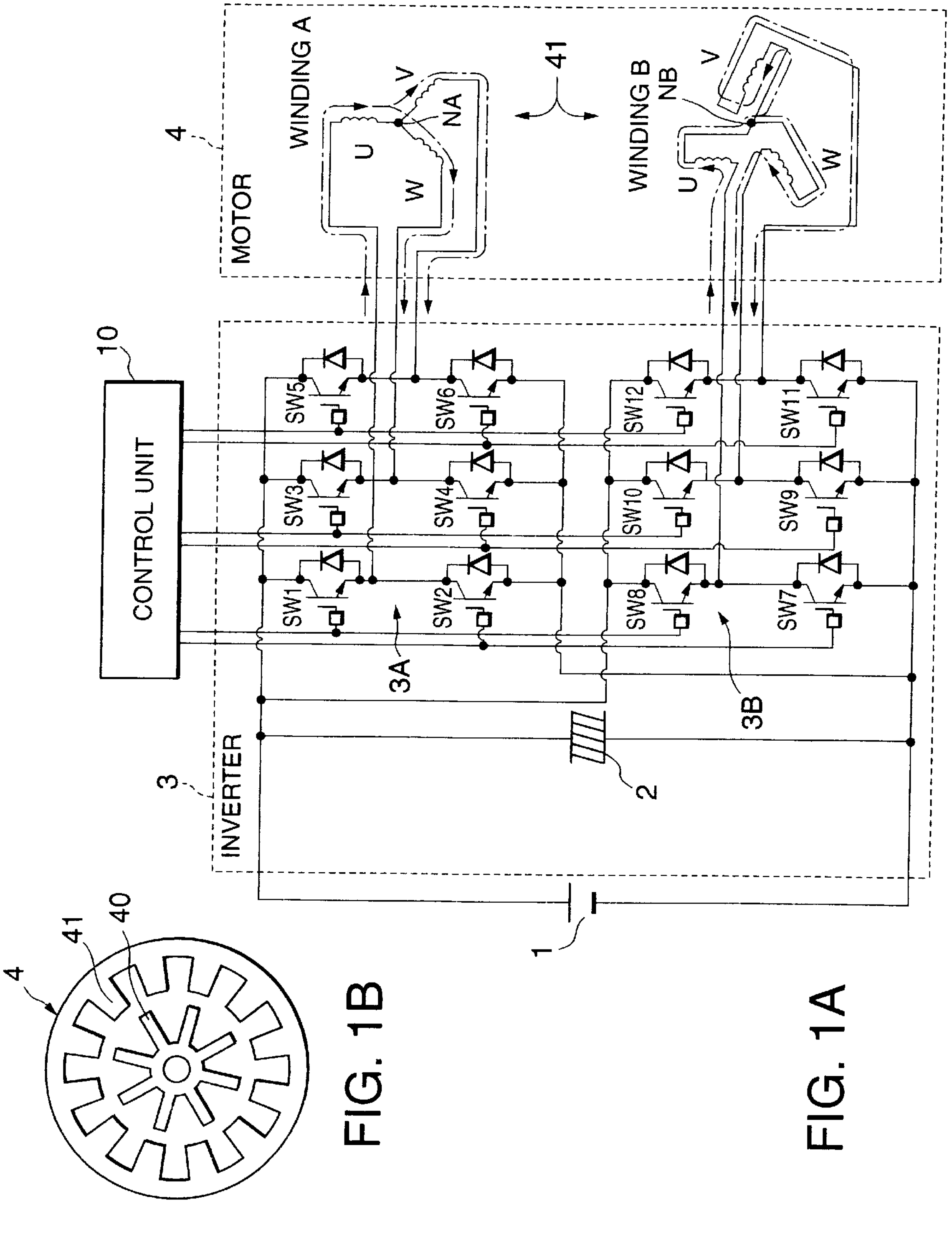
FIGS. 1A and 1B are a circuit diagram of an inverter and a motor and a schematic diagram of a rotor and a stator according to this invention.

Referring to FIGS. 1A and 1B, of the drawings, a stator of a three phase alternating current motor 4 comprises a rotor 40 and a stator 41, and the stator 41 comprises a stator winding A and stator winding B respectively wound in parallel in a phase U, phase V and phase W.

A three phase alternating current from a switching circuit 3A of an inverter 3 is supplied to the stator winding A. A three phase alternating current from a switching circuit 3B of the inverter 3 is supplied to the stator winding B.

The switching circuits 3A, 3B of the inverter 3 are connected in parallel to a battery 1. An electrolytic capacitor 2 to remove ripple current is interposed in a direct current section of the inverter 3 connected directly to the battery 1.

The switching circuit 3A comprises switching elements SW1–SW6 assembled in a bridge shape. The switching circuit 3B comprises switching elements SW7–SW12 assembled in a bridge shape.

A control unit 10 outputs a signal having a square waveform to the switching elements SW1–SW12 every 60 degrees, as shown in the tables of FIGS. 2A–2C In these figures, ON is expressed as “H” and OFF is expressed as “L.” The switching elements SW1–SW2 perform ON and OFF switching according to this signal.

For the phase U, the control unit 10 outputs an identical signal to the switching elements SW1, SW8. The same signal, but having a phase difference of 180 degrees, is output to the switching elements SW2 and SW7.

For the phase W the control unit 10 outputs an identical signal to the switching elements SW3 and SW10. The same signal, but having a phase difference of 180 degrees, is output to the switching elements SW4 and SW9.

For the phase V, the control unit 10 outputs an identical signal to the switching elements SW5 and SW12. The same signal, but having a phase difference of 180 degrees, is output for the switching elements SW6 and SW11.

As a result of the above signal outputs, currents with a phase difference of 60 degrees with respect to each other are obtained for the phases U, V, W of the stator winding A from the switching circuit 3A, as shown in FIGS. 4A–4C.

Moreover, currents of opposite phase to those of FIGS. 4A–4C flow for the phases U, V, W of the stator winding B from the switching circuit 3B.

That is, the switching performed by the switching circuit 3A of the inverter 3 which supplies current to the stator winding A of the motor 4, is opposite to the switching performed by the switching circuit 3B of the inverter 3 which supplies current to the stator winding B of the motor 4.

If the input voltage from the battery 1 to the inverter 3 is set to Ed, the voltage of the neutral point NA of the phases U, V, W of the stator winding A and stator winding B, will fluctuate between ⅓Ed and ⅔Ed, as shown in FIGS. 2A and 2B.

Here, the phases of ON and OFF between the switching elements SW1–SW6 and switching elements SW7–SW12 differ by 180 degrees so that, when the switching element SW1 is ON, the switching element SW7 is OFF, and when the switching element SW2 is OFF, the switching element SW8 is ON. Therefore, the voltage fluctuation of the neutral point NB of the stator winding B is equivalent to a shift of 180 degrees in the phase of the voltage fluctuation of the neutral point NA of the stator winding A.

The sum total of the terminal voltages of the motor 4 is the sum of the voltage of the neutral point NA of the stator winding A, and the voltage of the neutral point NB of the stator winding B, and as these voltages have a phase difference of 180 degrees, the sum value of the voltage of the neutral point NA and the voltage of the neutral point NB is always equal to 3/3Ed as shown in FIG. 2C. Consequently, the sum total of the terminal voltages of the motor 4 is 3/3Ed at any timing, and high frequency current can be stopped from leaking to the direct current side of the inverter 3.

Here, comparing for example the flow directions of the currents in identical phase intervals of FIGS. 2A and 2B, the currents in the stator winding A and stator winding B always flow in opposite directions.

Figure 3:
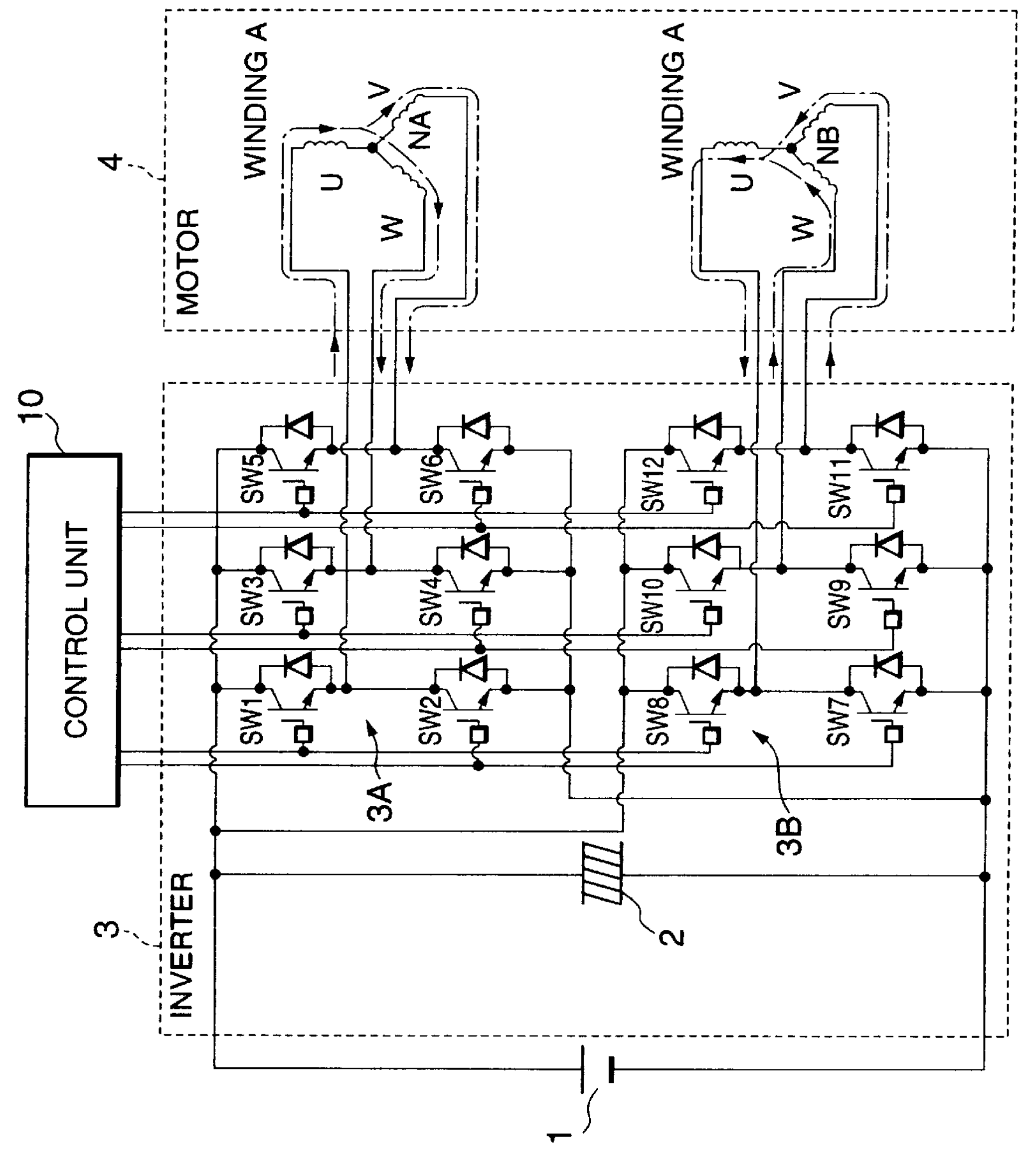
FIG. 3 is similar to FIG. 1, but showing the flow of current in the case where the winding direction of the motor differs from that of FIG. 1.

If the currents in the stator winding A and stator winding B always flow in opposite directions in this way, the current flow directions of phases U, V, W will all be reversed between the stator winding A and stator winding B. Therefore, if the stator winding A and stator winding B are wound in an identical direction as shown in FIG. 3, as the magnetic fluxes induced by the currents cancel each other out in the stator winding A and stator winding B, the motor 4 cannot be rotated.

Therefore, in the stator of this three phase alternating current motor 4, the winding direction of the stator winding B is arranged to be the reverse of that of the stator winding A, as shown in FIG. 1A. By reversing the directions of the windings in this way, the direction of the current in the stator winding A is the same as that in the stator winding B as shown in FIG. 2D, even when the switching elements SW7–SW12 perform switching in the same way as that in the table of FIG. 2B, so the motor 4 rotates.

On the other hand, as the total terminal voltage of the motor 4 which is the sum of the voltage of the neutral point NA of the stator winding A and the neutral point NB of the stator winding B is kept constant, high frequency current does not leak to the direct current side of the inverter 3.

Instead of the switching elements SW1–SW12 performing switching by a square wave signal, pulse width modulation which is shown in FIGS. 5A–5C can also be used.

When switching is performed by pulse width modulation, the change-over frequency of "H" and "L" of the switching elements SW1–SW12 becomes very high, as shown in FIGS. 6A and 6B.

However, also in this case, the control principle is the same as that of the first embodiment, and the setting is such that switching between "H" and "L" by the switching elements SW7–SW12, and switching between "H" and "L" by the switching elements SW1–SW6, is performed with a phase difference of 180 degrees. In other words, opposite switching is performed in the switching circuits 3A and 3B so that, when the switching element SW1 is "H", for example, the switching element SW7 is "L", and when the switching element SW2 is "L", the switching element SW8 is "H."

Consequently, as shown in FIG. 6C, the total terminal voltage of the motor 4 which is the sum of the voltage of the neutral point NA of coil A and the voltage of the neutral point NB of coil B is ⅔Ed at any timing, and leakage of RF current to the direct current side of the inverter 3 can be suppressed.

The electrolytic capacitor 2 for removing ripple current is provided in the direct current section of the inverter 3 in the circuit diagram of FIG. 1A, but the electrolytic capacitor can be omitted for the following reason.

Figure 7A:
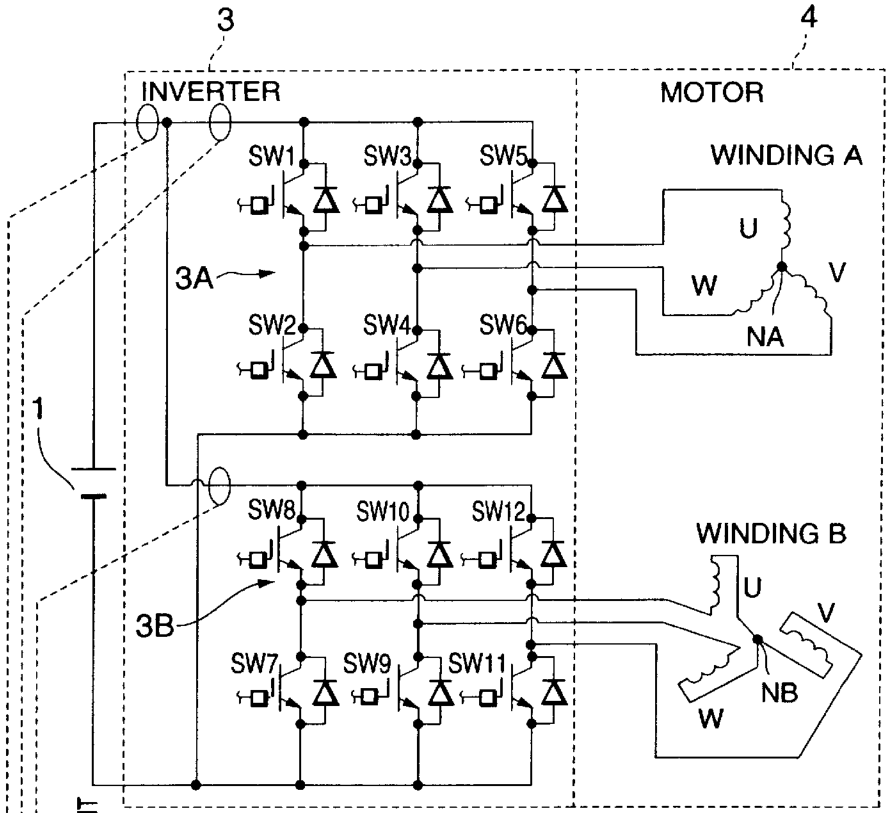
FIGS. 7A–7D are diagrams showing a circuit diagram of the inverter without electrolytic capacitor, the motor, and the current waveforms of various inverter parts.

The inverter shown in FIG. 7A is the same as the inverter 3 of FIG. 1A, only the electrolytic capacitor having been removed, and the remaining features of the construction are the same as those of the inverter 3 of FIG. 1A.

The phases U, V, W have coils for the stator winding A and for the stator winding B. The switching circuit 3A supplies alternating current power to the coil of stator winding A, and the switching circuit 3B supplies alternating current power to the coil of stator winding B.

Figure 7B:
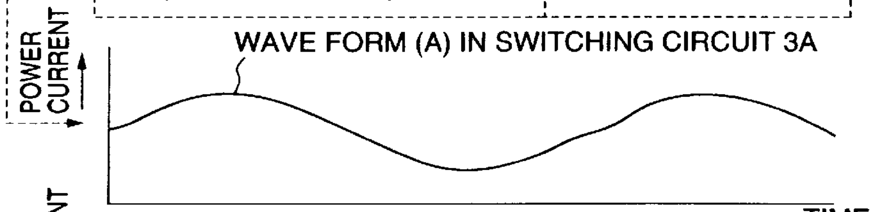
Figure 7C:
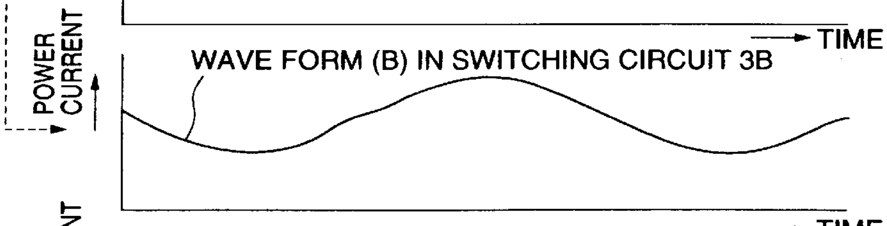
Figure 7D:
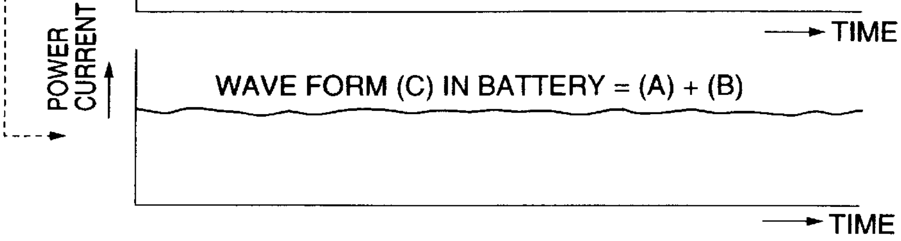

For the coils of the stator windings 3A, 3B of identical phase, the switching circuits 3A, 3B perform ON/OFF control of the switching elements inversely to each other. As a result, the waveform of the current which flows from the positive electrode of the battery 1 to the switching circuit 3A, and the waveform of the current which flows from the positive electrode of the battery 1 to the switching circuit 3B, have opposite phases as shown in FIGS. 7B, 7C. The waveform of the current which flows to the battery 1 is a combined waveform of these current waveforms, and it is effectively constant as shown in FIG. 7D.

The surge voltage generated when one switching element of the switching circuits 3A, 3B is "L" can also be eliminated by the other switching element of the pair is "H." Consequently, the ripple current can be removed even if the electrolytic capacitor is not provided. This contributes to compactness of the inverter 3.

Figure 8:
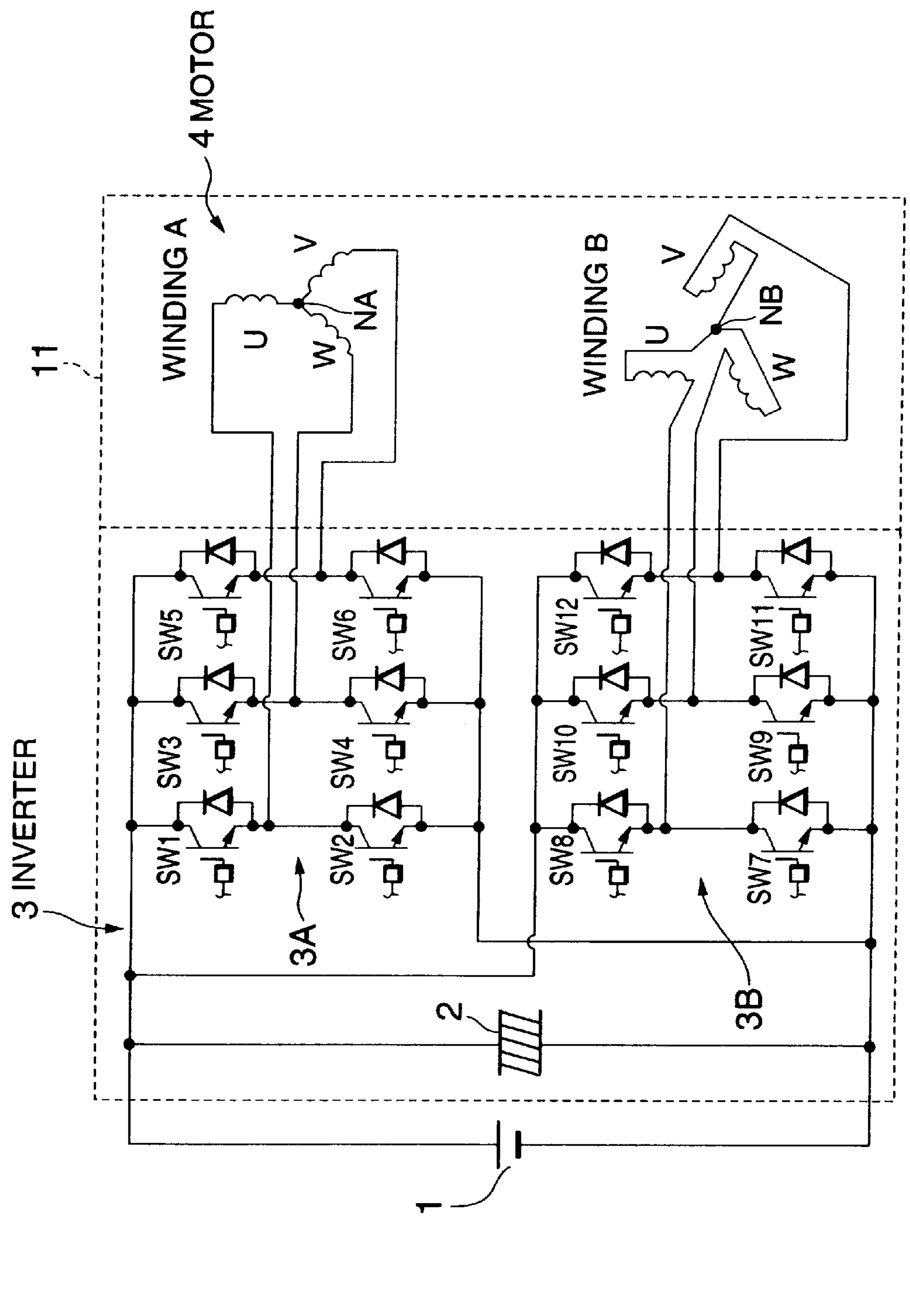
FIG. 8 is a circuit diagram of the inverter and motor housed in the same case.

If the inverter 3 and the motor 4 are built into the same case 11 as shown in FIG. 8, the inverter 3 and motor 4 can be made lightweight and compact which is particularly desirable when they are mounted on a vehicle.

Next, a second embodiment of this invention will be described referring to FIGS. 9 and 10.

Figure 9:
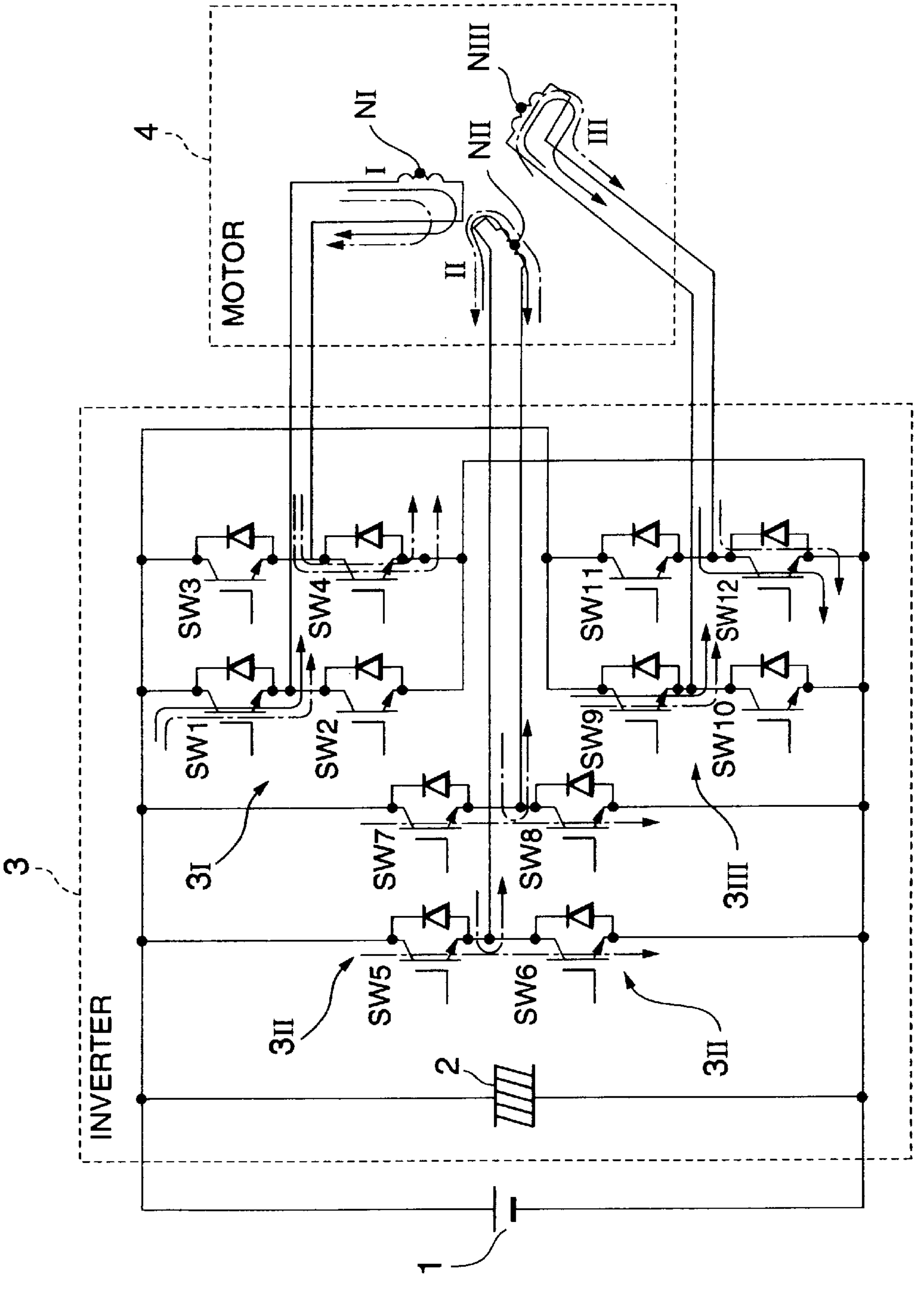
FIG. 9 is a circuit diagram of the inverter and motor according to a second embodiment of this invention.

In this embodiment, the stator winding of the motor 4 comprises phase I, phase II and phase III which are mutually independent as shown in FIG. 9. Switching circuits 3I, 3II and 3III which perform switching are separately connected to the inverter 3. The switching circuit 3I is connected to the coil of phase I, the switching circuit 3II is connected to the coil of phase II, and the switching circuit 3III is connected to the coil of phase III of the alternating current motor 4, respectively.

The switching circuit 31 comprises a bridge of the switching elements SW1–SW4, the switching circuit 3H comprises a bridge of the switching elements SW5–SW8, and the switching circuit 31H comprises a bridge of the switching elements SW9–SW12.

By controlling the switching circuits 3I, 3II and 3III by a signal shown in the table of FIG. 10, a current flow is set up so that the sum total of the terminal voltages of the motor 4 does not depend on switching timing, but is always effectively constant as in the first embodiment.

For example, in the area where the switching timing is 0 to 60 degrees, by holding the signal to the switching elements SW1, SW4, SW5, SW8, SW9, SW12 of the switching circuits 3I, 3II and 3II to "H", current is passed from the coil of phase I to the coil of phase II and the coil of phase III, as shown by the first pair of solid arrows in the table of FIG. 10. In the next area of 60 to 120 degrees, the switching elements SW1, SW4, SW9, SW12 of the switching circuits 3I, 3II and 3II are then held at "H", the signal to the switching elements SW5, SW8 of the switching circuit 3II is set to "L", and the signal to the switching elements SW6, SW7 is set to "H". This passes a current from the coil of phase I and the coil of phase II to the coil of phase III, as shown by the second pair of solid arrows in the table. Hereafter, the same current flow as in the first embodiment is obtained by outputting "H" and "L" signals to the switching elements alternately every 60 degrees.

Consequently, as shown in FIG. 10, the sum of the voltages of the neutral points NI, NII, NIII of phase I, phase II and phase III of the motor 4 are ½Ed compared to the input voltage Ed to the inverter 3, and the total terminal voltage of the motor does not depend on switching timing but is almost fixed.

Also in this embodiment, the electrolytic capacitor may be omitted.

Figure 11:
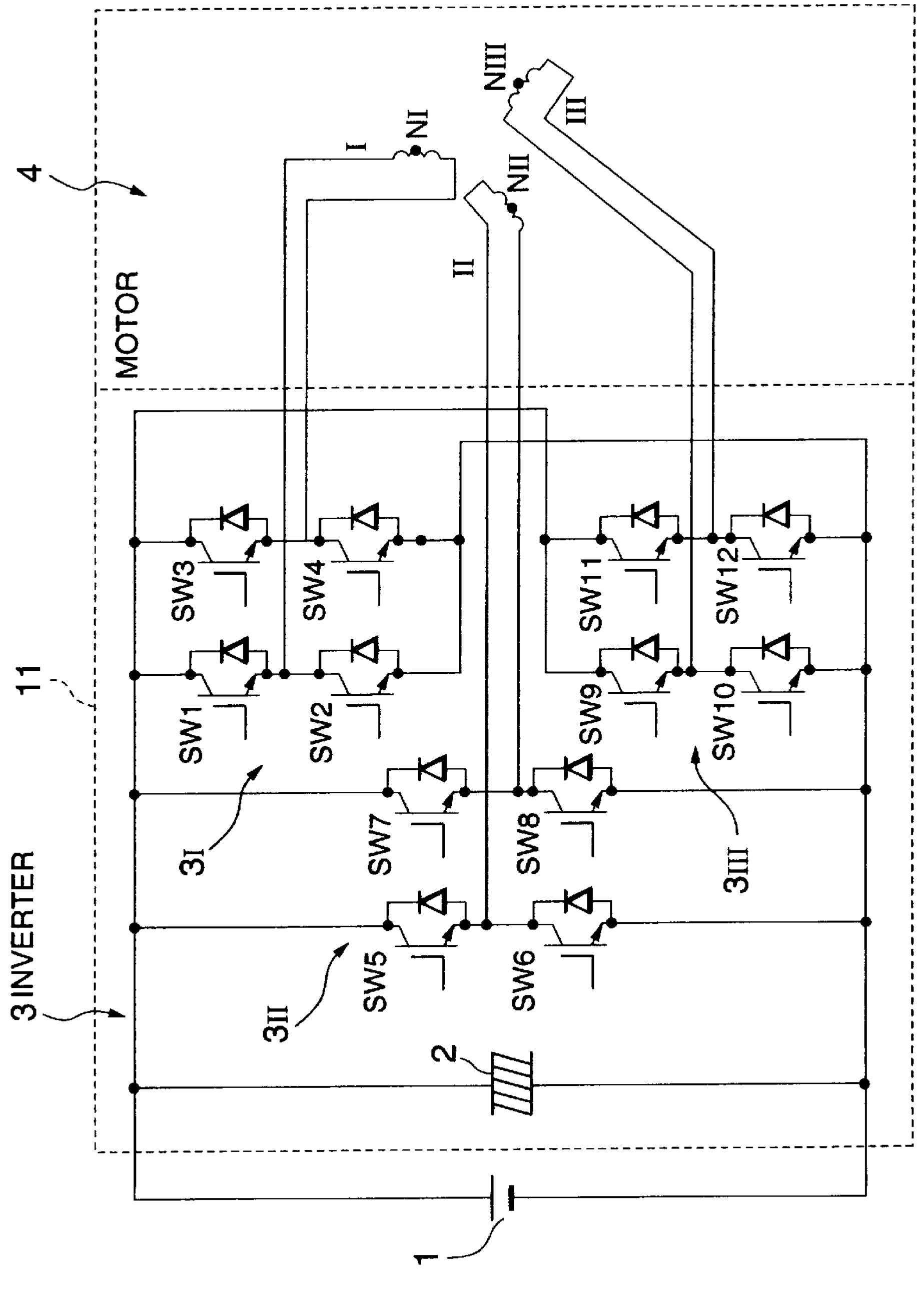
FIG. 11 is a circuit diagram of the inverter and motor which housed in the same case according to the second embodiment of this invention.

Moreover, in this embodiment, by housing the inverter 3 and the motor 4 in the same case 11 as shown in FIG. 11, the inverter 3 and motor 4 can be made more lightweight and compact which is especially suitable for installing in a vehicle.

Next, a third embodiment of this invention will be described referring to FIGS. 12–18.

This embodiment relates to the winding method of the stator windings A and B of the motor 4. The circuit layout is identical to that of the first embodiment shown in FIG. 1A.

In this embodiment, concentrated coils are used in the stator windings A and B.

It will be assumed that the motor 4 is an eight pole rotor equipped with the same three phase, twelve slot stator as that of FIG. 7. The stator winding A and stator winding B both comprise coils of phase U, V and W each comprising two slots. For the purpose of identification, the U, V, W phases of the stator winding B will be referred to as U', V', W'.

Figure 12:
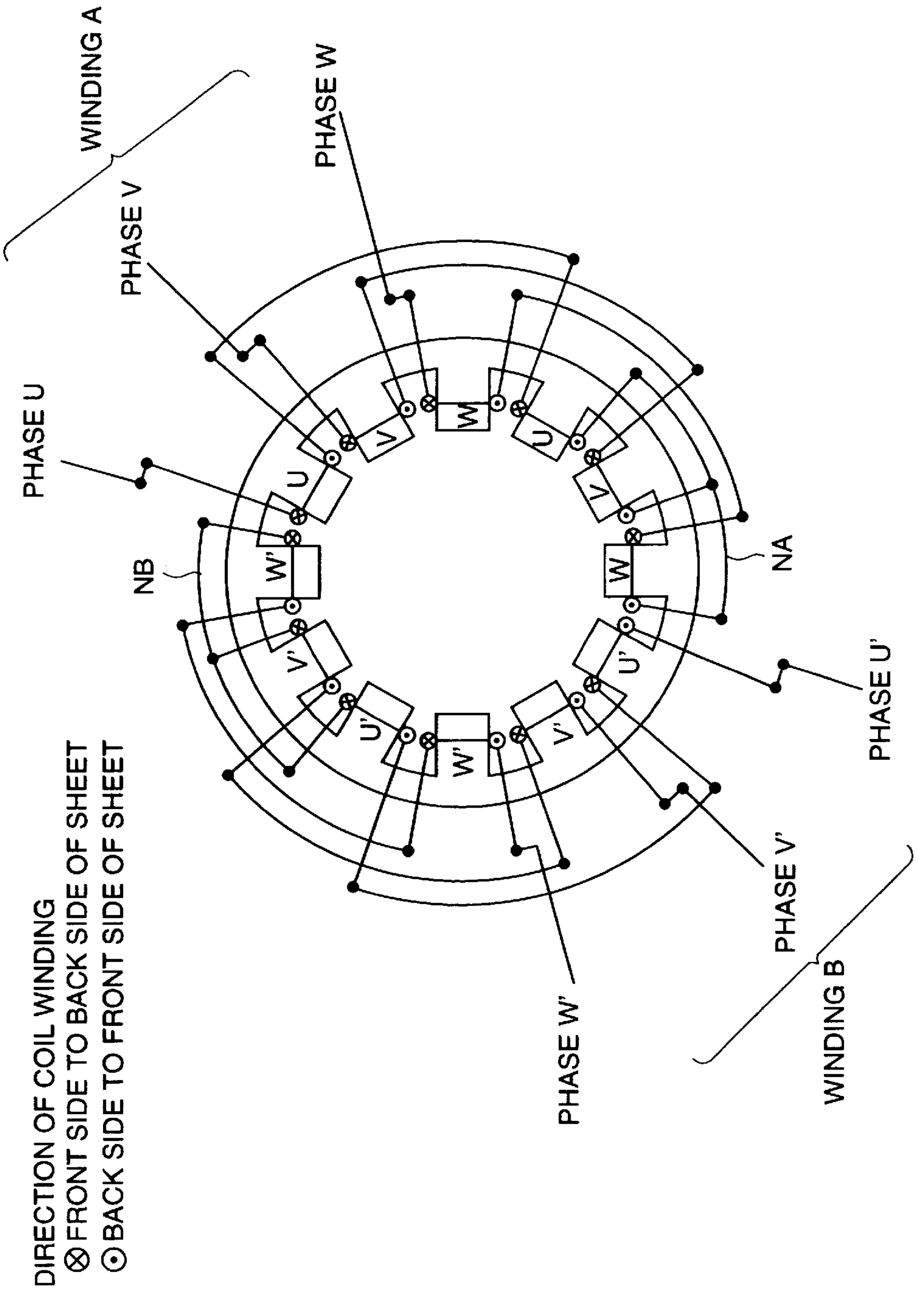
FIG. 12 is a diagram showing an arrangement of a stator winding of the motor according to a third embodiment of this invention.
Figure 13:
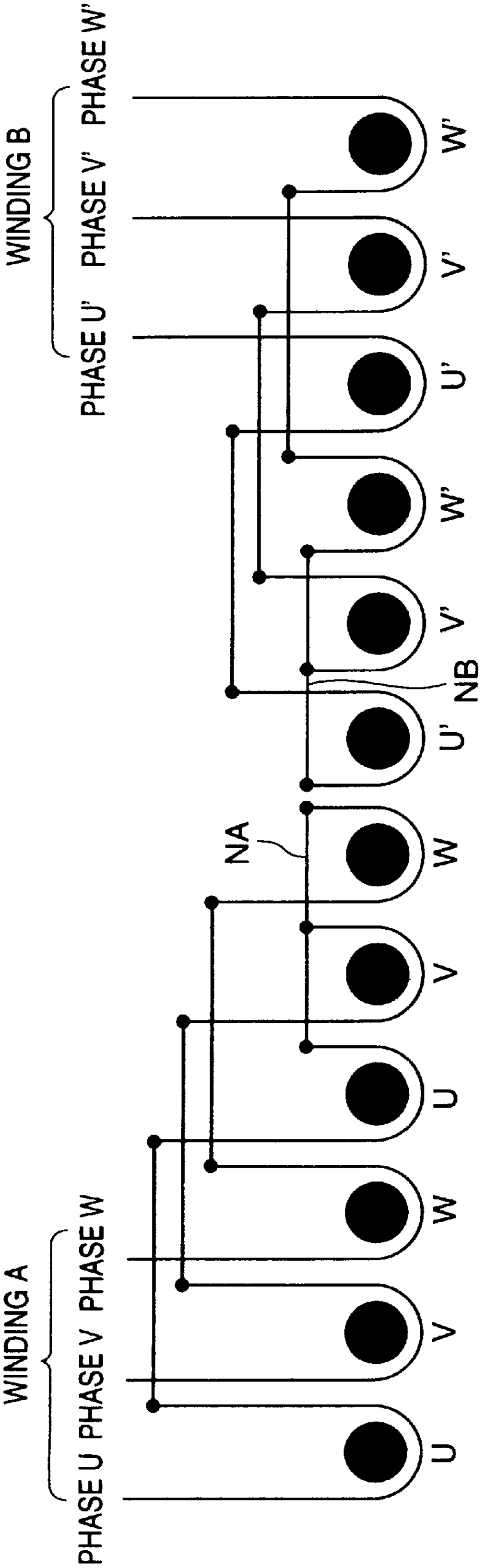
FIG. 13 is a diagram showing the arrangement of the stator winding of FIG. 12 in a different graphic representation.

The windings in the twelve slots therefore comprise coils arranged in the order U, V, W, U, V, W, U', V', W', U', V', W'. The coil windings U, V, W, U, V, W, correspond to the stator winding A, and the coil windings U', V', W', U', V', W'correspond to the stator winding B. Due to this coil arrangement, the coil U' faces the coil U, the coil V' faces the coil V, and the coil W' faces the coil W, as shown in FIG. 12.

The winding directions of the coils U, U' are arranged to be opposite, the winding directions of the coils V, V' are arranged to be opposite, and the winding directions of the coils W, W' are arranged to be opposite.

Due to this arrangement of concentrated coil windings, the length of the coils can be made shortest in the stator winding A and in the stator winding B.

Figure 14:
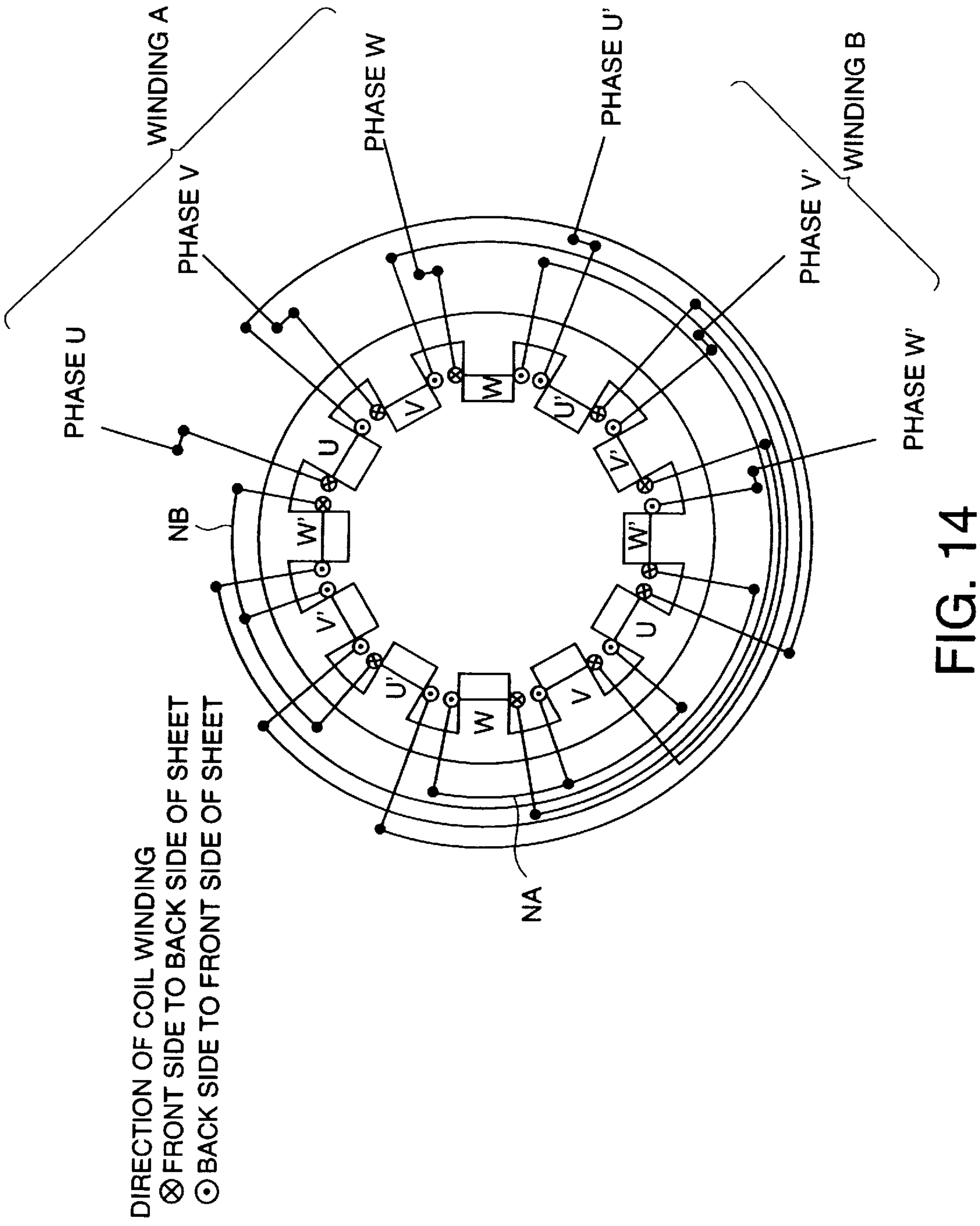
FIG. 14 is similar to FIG. 12 but showing an alternative arrangement of the stator winding.
Figure 15:
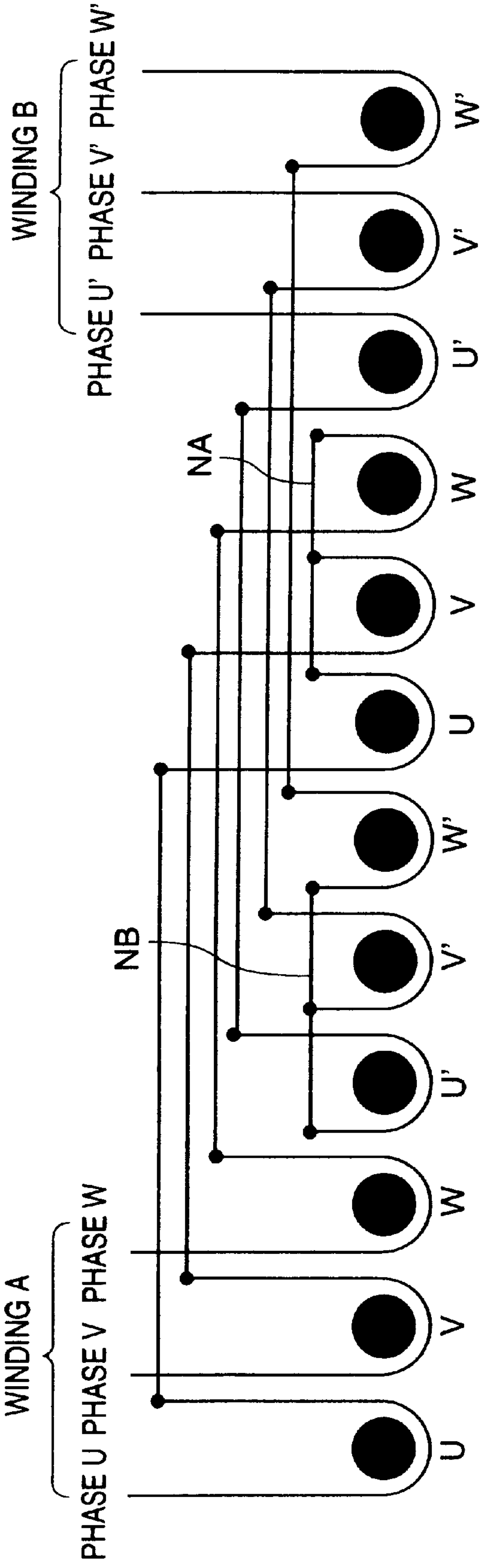
FIG. 15 is similar to FIG. 13 but showing the stator winding of FIG. 14.

FIGS. 14 and 15 show another arrangement of coils using concentrated coil windings. Herein, the coils are arranged in the order U, V, W, U', V', W', U, V, W, U', V', W'. Due to this arrangement of coils, as shown in FIG. 14, the coil U and coil U, coil V and coil V, and coil W and coil W of the stator winding A are respectively arranged at intervals of 180 degrees, and the coil U' and coil U', coil V' and coil V', and coil W' and coil W' of the stator winding B are respectively arranged at intervals of 180 degrees.

This arrangement of coils eliminates imbalance of properties between coils of identical phase facing each other, and reduces torque ripple.

Figure 16:
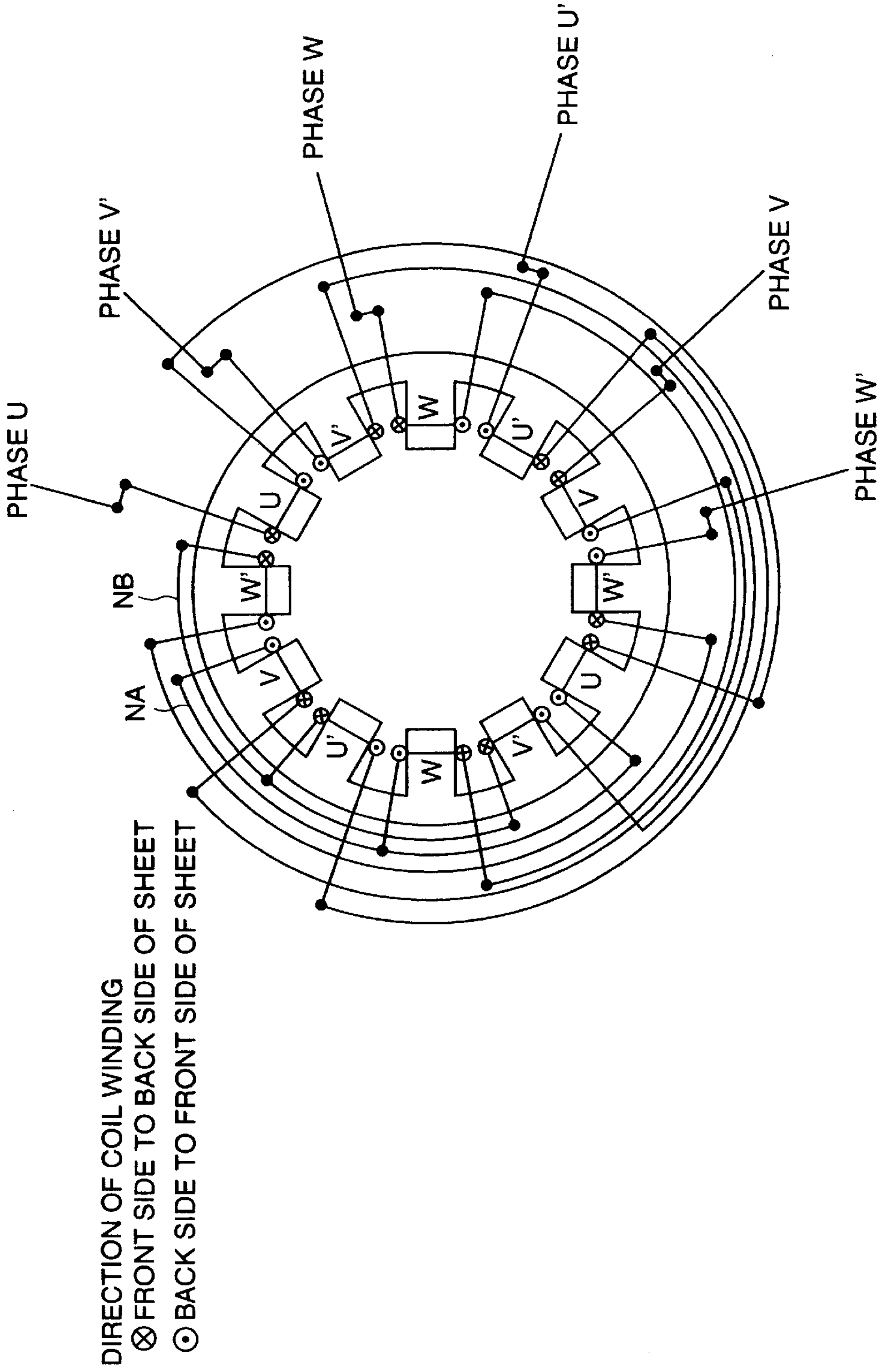
FIG. 16 is similar to FIG. 14 but showing another alternative arrangement of the stator winding.
Figure 17:
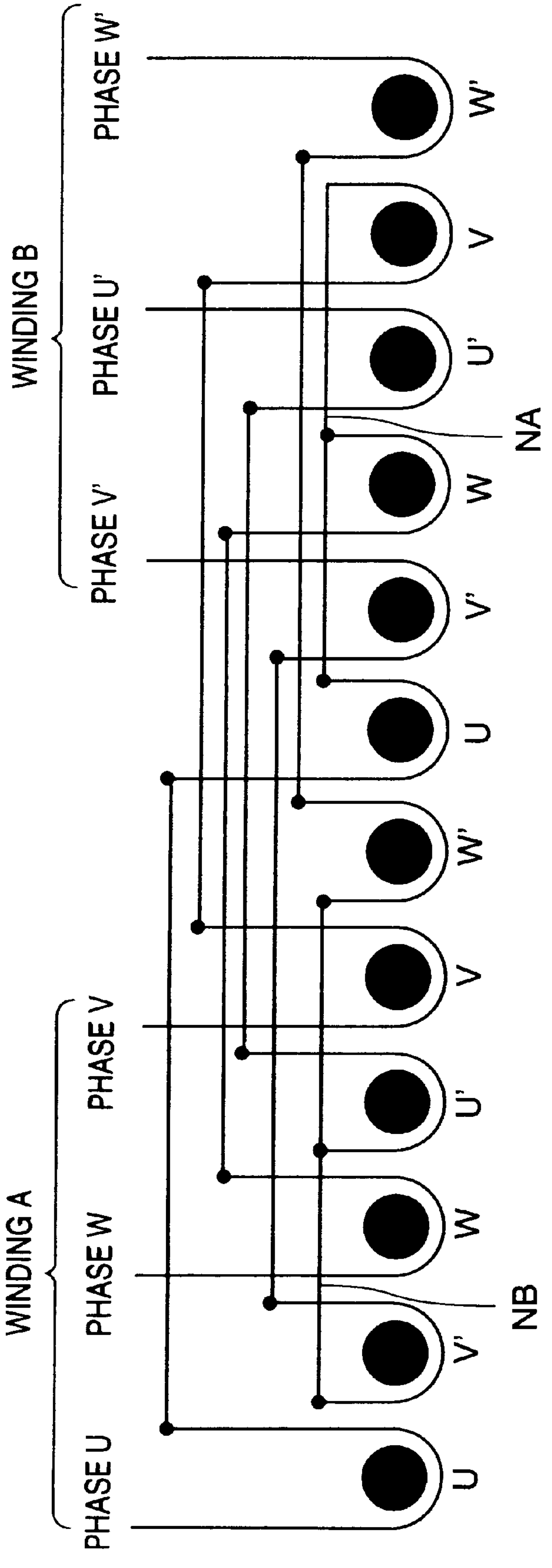
FIG. 17 is similar to FIG. 15 but showing the stator winding of FIG. 16.

FIGS. 16 and 17 show yet another arrangement of coils using concentrated coil windings. Herein, the coils are arranged in the order U, V', W, U', V, W', U, V', W, U', V, W'. Due to this arrangement also, the coil U and coil U, coil V and coil V, and coil W and coil W of the stator winding A are respectively arranged at intervals of 180 degrees, and the coil U' and coil U', coil V' and coil V', and coil W' and coil W' of the stator winding B are respectively arranged at intervals of 180 degrees.

In this arrangement of coils, coils of identical phase are arranged opposite each other, and the coils of the stator winding B are necessarily disposed alongside the coils of the stator winding A. Therefore, imbalance in properties between coils of the same phase can be eliminated, and imbalance of the ends of the coils can also be eliminated, so torque ripple can be reduced further.

Figure 18:
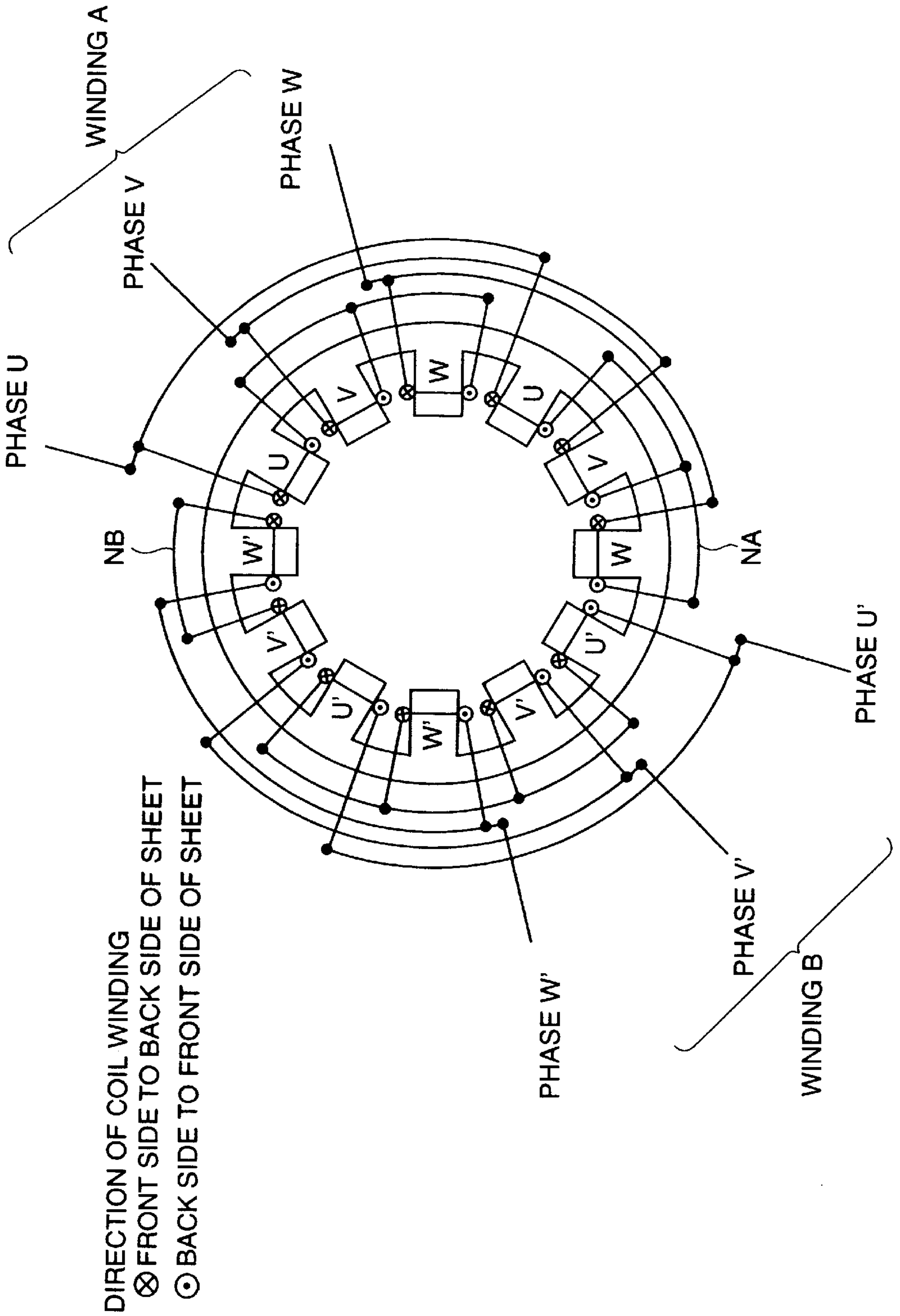
FIG. 18 is similar to FIG. 16 but showing yet another alternative arrangement of the stator winding.

According to this third embodiment, series windings are used wherein for example after winding the coil of phase U of one slot, a coil of phase U of another slot is wound, however the parallel winding arrangement shown in FIG. 18 may also be adopted depending on electrical design or manufacturing specifications.

Next, a fourth embodiment of this invention will be described referring to FIGS. 19–24.

This embodiment also relates to the winding method of the stator windings A and B of the motor 4, and the circuit layout of the inverter 3 and motor 4 is identical to the circuit layout of the first embodiment shown in FIG. 1A.

Whereas in the third embodiment the number of slots was twelve, in this embodiment, the number of slots is twenty four.

Figure 19:
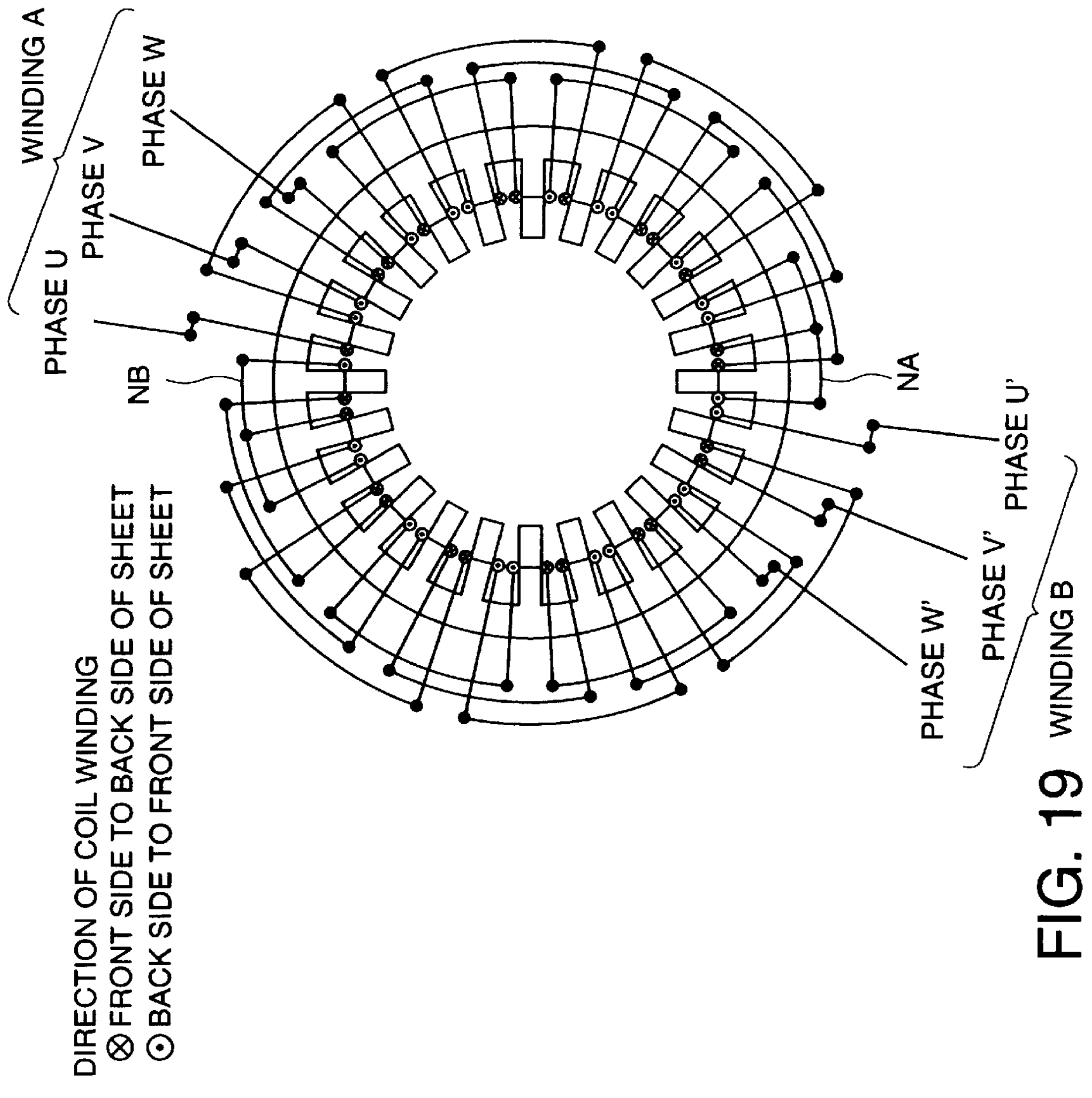
FIG. 19 is a diagram showing an arrangement of the stator winding of the motor according to a fourth embodiment of this invention.
Figure 20:
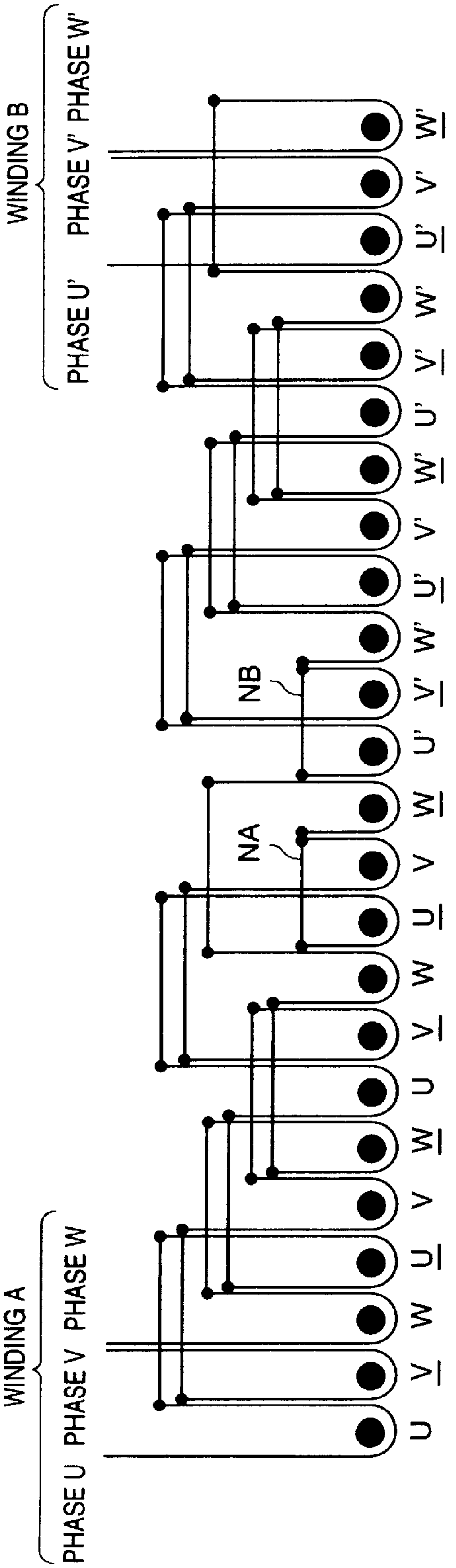
FIG. 20 is a diagram showing the arrangement of the stator winding of FIG. 19 in a different graphic representation.

As shown in FIGS. 19 and 20, in this concentrated arrangement of coils in twenty four slots, the coils are wound in the order U, V, W, U, V, W, U, V, W, U, V, W, U', V', W', U', V', W', U', V', W', U', V', W'. In this case also, as in the case of FIG. 12 of the third embodiment, the coil U and coil U' face each other, the coil V and coil V' face each other, and the coil W and coil W' face each other. Also, the coil U and coil U', coil V and coil V', and coil W and coil W' are given opposite winding directions.

Further, the coils are wound so that adjacent coils have opposite winding directions. In the above description, one winding direction is represented by U, V, W, U', V', W', and the opposite winding direction is represented by U̲, V̲, W̲, U̲', V̲', W̲'. This arrangement is possible as there are twenty four slots, i.e., twice the number in the third embodiment.

In this winding arrangement, the length of the coils can be made the shortest as in the winding arrangement of FIG. 12 of the third embodiment.

Figure 21:
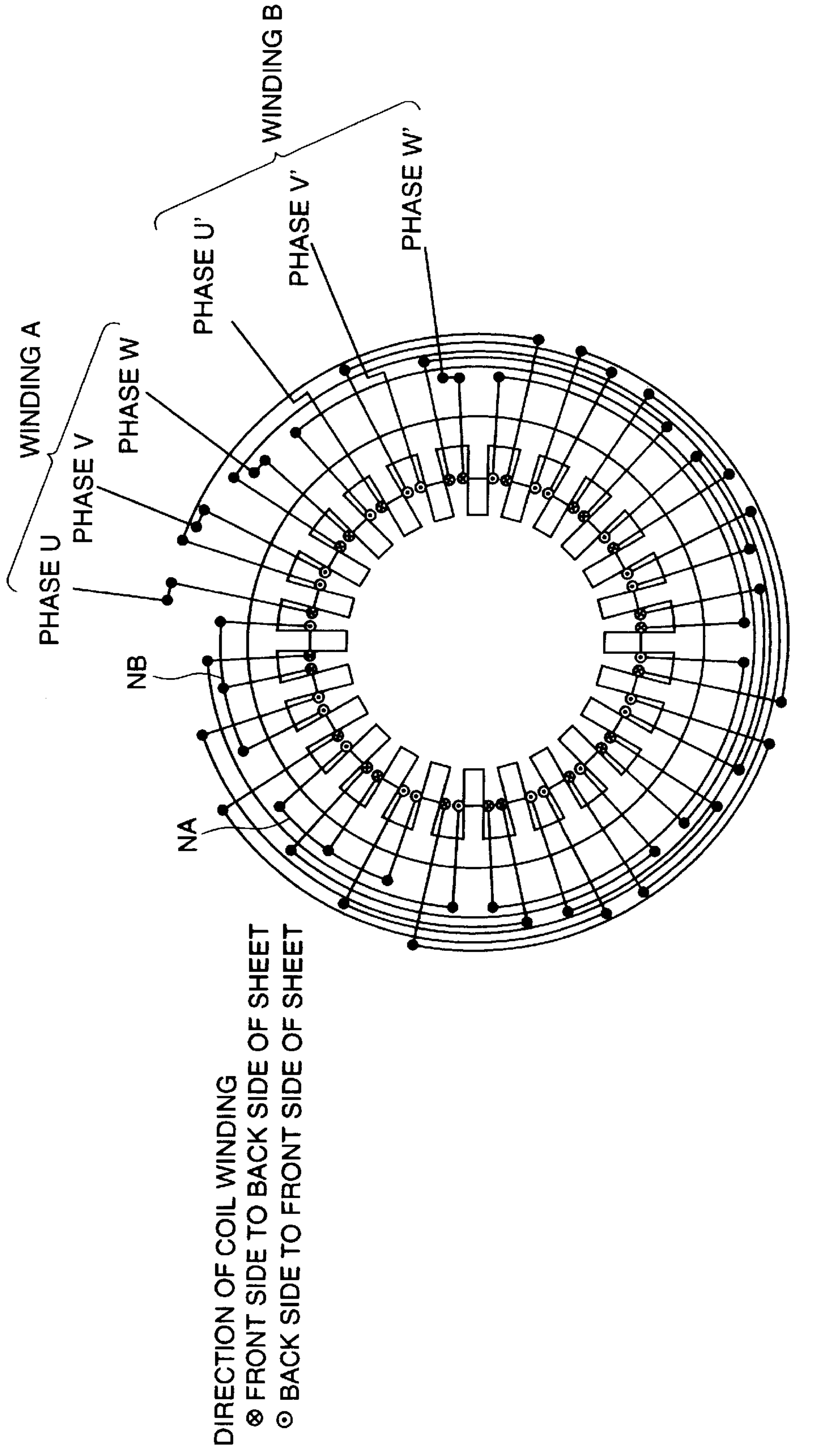
FIG. 21 is similar to FIG. 19 but showing an alternative arrangement of the stator winding.
Figure 22:
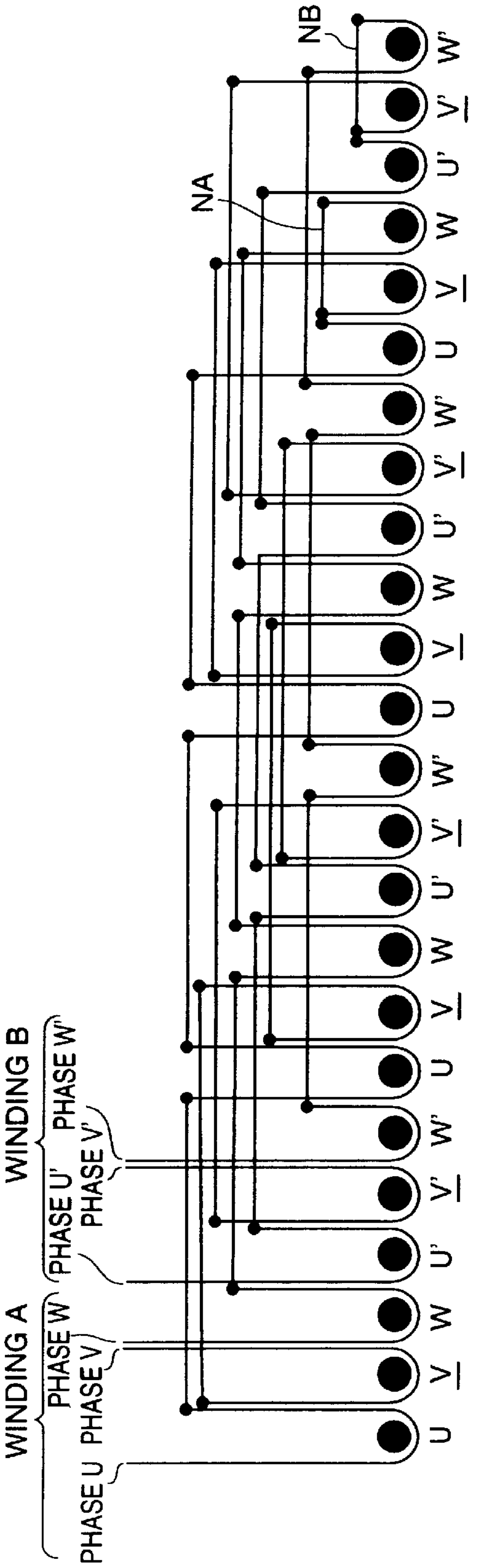
FIG. 22 is similar to FIG. 20 but showing the stator winding of FIG. 21.

FIGS. 21 and 22 show another arrangement of concentrated coil windings in twenty four slots.

Herein, the coils are wound in the order U, V, W, U', V', W', U, V, W. U', V', W', U, V, W, U', V', W', U, V, W, U', V', W'. The coil U and coil U', coil V and coil V' and coil W and coil W' are respectively wound in the same directions, whereas the coil V is wound in an opposite direction to the coil U and coil W, and the coil V' is wound in an opposite direction to the coil U' and coil W'.

In other words, in the above representation, the order of coils is U, V̲, W, U', V̲', W', U, V̲, W, U', V̲', W', U, V̲, W, U', V̲', W', U, V̲, W, U', V̲', W'.

In this winding arrangement, all coils having the same phase can be wound in the same direction, so manufacture of the motor 4 is easy. Also, coils of the same phase are arranged at intervals of 180 degrees as in FIG. 14 of the third embodiment, so imbalance of properties between coils of identical phase is eliminated and torque ripple is reduced.

Figure 23:
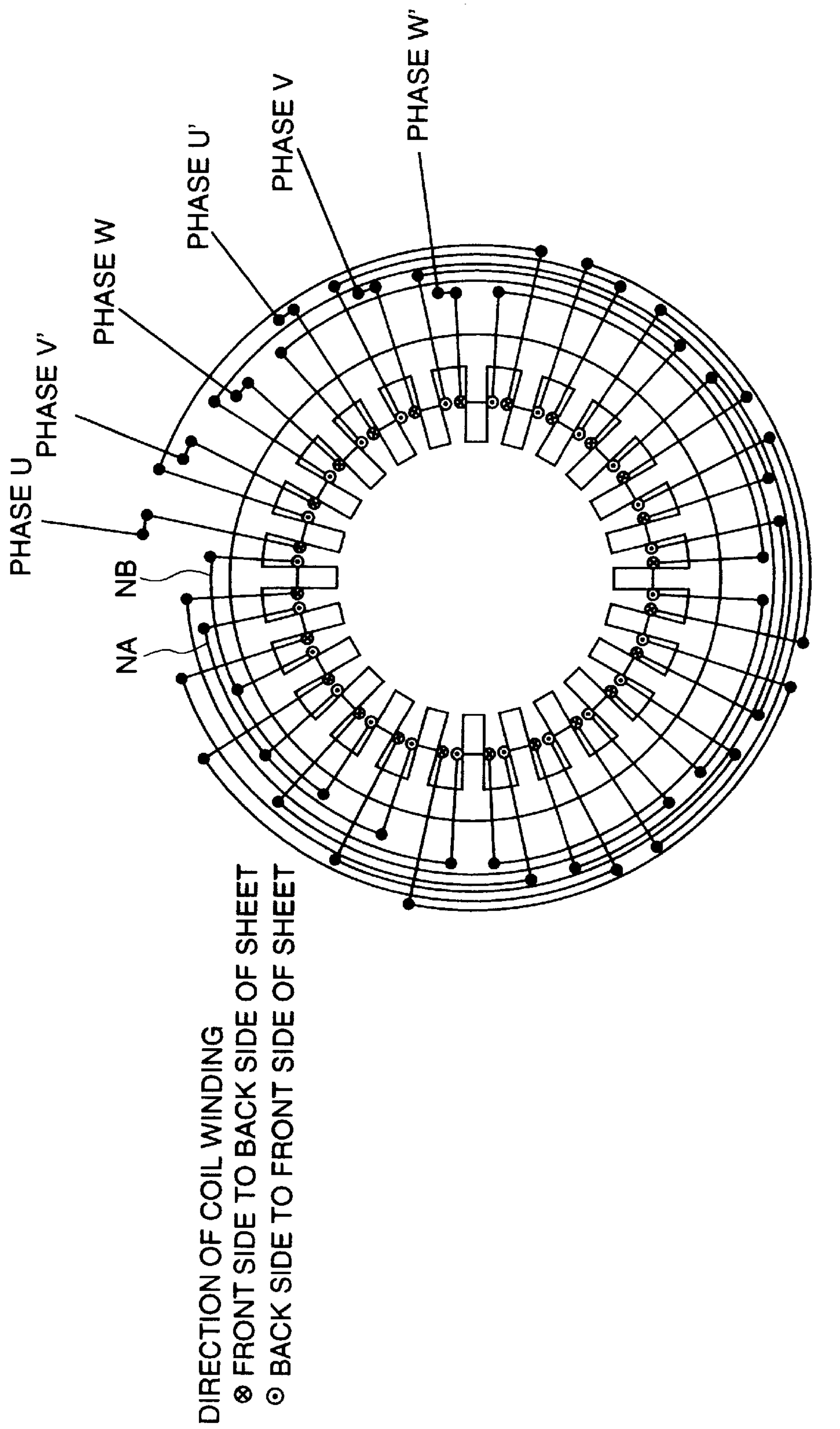
FIG. 23 is similar to FIG. 21 but showing another alternative arrangement of the stator winding.
Figure 24:
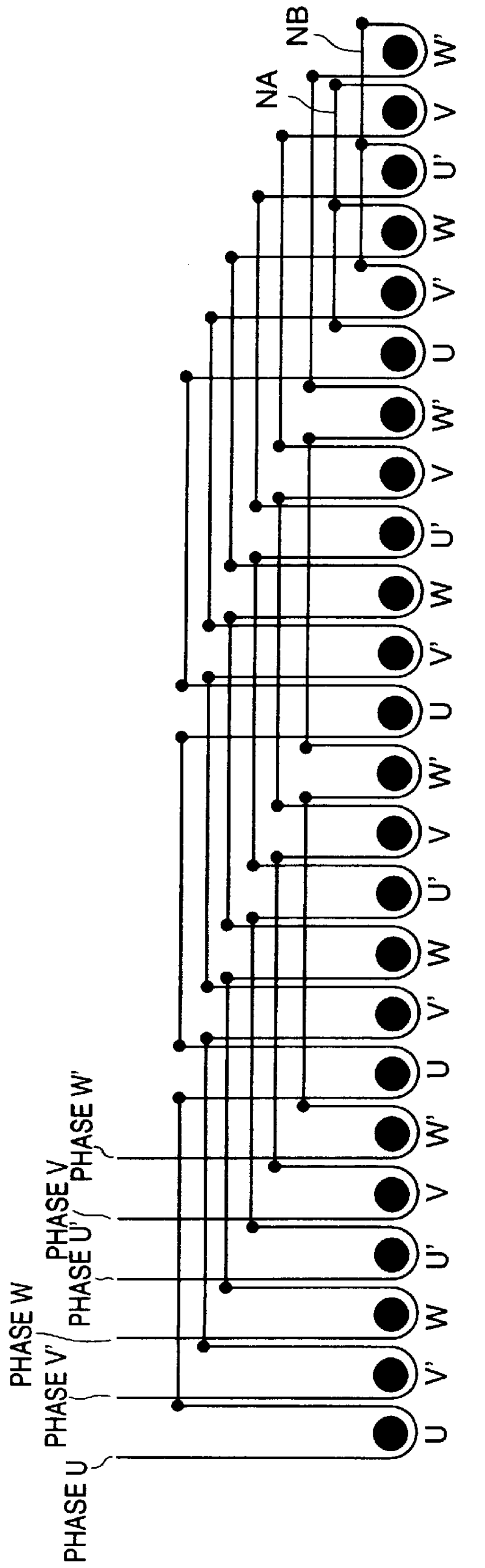
FIG. 24 is similar to FIG. 22 but showing the stator winding of FIG. 23.

FIGS. 23 and 24 show yet another arrangement of concentrated coil windings in twenty four slots. Herein, the order of coils is U, V', W, U', V, W', U, V', W, U', V, W', U, V', W, U', V, W', U, V', W, U', V, W'.

Due to this arrangement, the winding direction of all coils is the same and the length of coil wire required for the windings is the same for each coil, so manufacture of the motor 4 is easy. Also, as the coils of the stator winding A and the coils of the stator winding B are disposed alternately, imbalances at the ends of the coils are canceled out, and torque ripple is reduced to a very low level. Further, even if one of the switching circuits 3A, 3B is faulty, the motor 4 can still be rotated by the other switching circuit. In this case, however, the rotation direction is reversed.

The contents of Tokugan Hei 11-134730 and Tokugan Hei 11-134742, both of which have filed on May 14, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A motor and an inverter which drives the motor, wherein the motor comprises:
   a stator comprising a first group of coils and a second group of coils, each group of coils generating a rotating magnetic field by supplying a three-phase alternating current to the coils of each group, a winding direction of the coils of the second group being opposite to a winding direction of the coils of the first group having an identical phase; and
   a rotor which rotates due to the rotating magnetic field generated by the first group of coils and the rotating magnetic field generated by the second group of coils; and wherein the inverter comprises:
   two switching circuits, each of the circuits comprising plural switching elements and supplying the three-phase alternating current to the coils of each group according to the switching action of the plural switching elements; and a control unit which controls the switching elements of the switching circuits corresponding to each group to cause the sum of terminal voltages of the coils of each group to be constant.

2. A motor and inverter as defined in claim 1, wherein the coils of the plural groups are of concentrated windings.

3. A motor and inverter as defined in claim 1, wherein the coils of the first group and the coils of the second group are arranged in parallel in the same slots.

4. A motor and inverter as defined in claim 1, wherein the coils of the first group and the coils of the second group are disposed alternately.

5. A motor and inverter as defined in claim 1, wherein the coils of each group comprise coils of plural phase formed by parallel windings.

6. A motor and inverter as defined in claim 1, wherein the inverter comprises a pair of direct current terminals connected to a direct current power supply, between which an electrolytic capacitor is not connected.

7. A motor and inverter as defined in claim 1, wherein the motor and inverter are housed in a same case.

8. A motor and an inverter which drives the motor by supplying a three-phase alternating current to the motor, wherein the motor comprises:

a stator which generates a rotating magnetic field according to the supply of a three-phase alternating current to a first coil, a second coil and a third coil corresponding to each phase of the three-phase alternating current; and a rotor which rotates according to the rotating magnetic field of the stator; and wherein the inverter comprises:

a first switching circuit which supplies a first alternating current to the first coil according to a switching action of plural switching elements;

a second switching circuit which supplies a second alternating current to the second coil according to a switching action of plural switching elements;

a third switching circuit which supplies a third alternating current to the third coil according to a switching action of plural switching elements; and a control unit which controls the switching elements of the first switching circuit, the switching elements of the second switching circuit, and the switching elements of the third switching circuit to cause the sum of a terminal voltage of the first coil, a terminal voltage of the second coil and a terminal voltage of the third coil to be constant.

9. A motor and inverter as defined in claim 8, wherein the motor and inverter are housed in a same case.

* * * * *